United States Patent [19]

Charng

[11] Patent Number: 5,339,490
[45] Date of Patent: Aug. 23, 1994

[54] DUAL WIPER BLADE ASSEMBLY

[75] Inventor: Cedric S. K. Charng, Taipei, Taiwan

[73] Assignee: China Wiper Special Rubber Co., Ltd., Tamsui Taipei, Taiwan

[21] Appl. No.: 641,534

[22] Filed: Jan. 15, 1991

[30] Foreign Application Priority Data

Mar. 6, 1990 [GB] United Kingdom ................. 9004956

[51] Int. Cl.5 ............................. B60S 1/02; B60S 1/28
[52] U.S. Cl. ................. 15/250.41; 15/250.42; 15/250.31
[58] Field of Search ........... 15/250.40, 250.41, 250.42, 15/250.36, 250.35, 250.31, 250.09

[56] References Cited

U.S. PATENT DOCUMENTS 4,317,251  3/1982  Priesemuth ........................ 15/250.41
4,442,566  4/1984  Sharp ................................ 15/250.42
4,628,565  12/1986 Wolters ............................. 15/250.41

FOREIGN PATENT DOCUMENTS 0232598  11/1986  European Pat. Off. .
0327233  1/1989   European Pat. Off. .
2267911  11/1975  France .............................. 15/250.42
2038169  12/1979  United Kingdom .
2189383  10/1987  United Kingdom ............. 15/250.42

Primary Examiner—Timothy F. Simone
Assistant Examiner—Gary K. Graham
Attorney, Agent, or Firm—Howson and Howson

[57] ABSTRACT

An elongate wiper blade assembly comprises a yoke structure provided with a plurality of claw members, each claw member being designed to support a pair of backing strips each adapted to carry a wiper element, 14 Claims, 3 Drawing Sheets

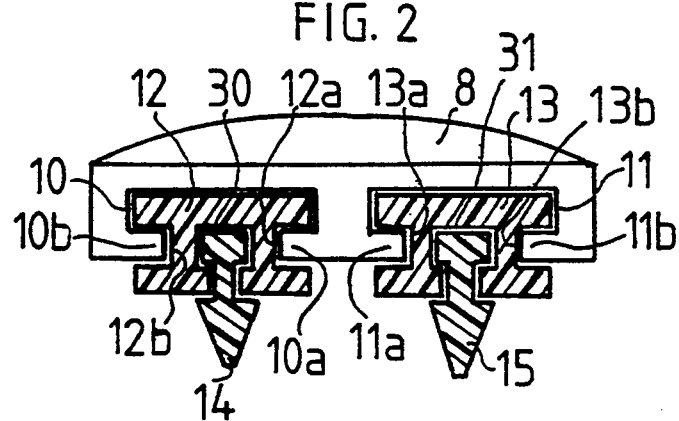
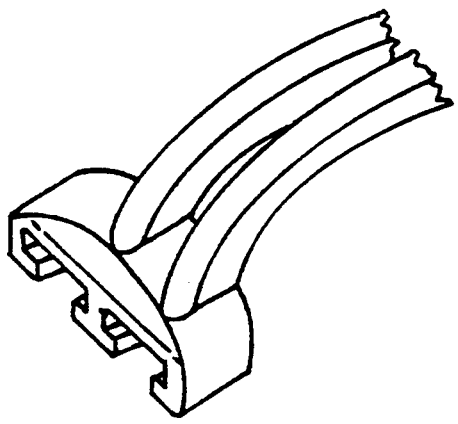
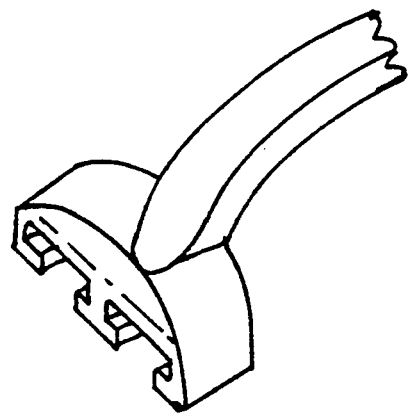
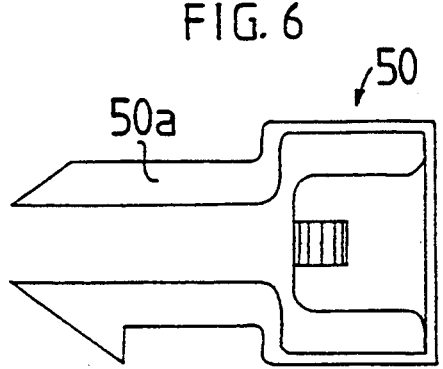
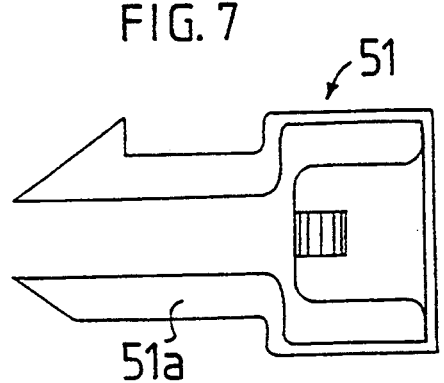

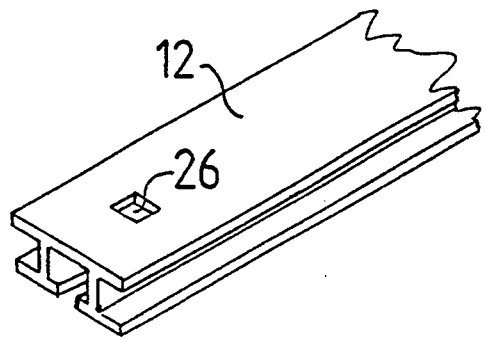
FIG. 5
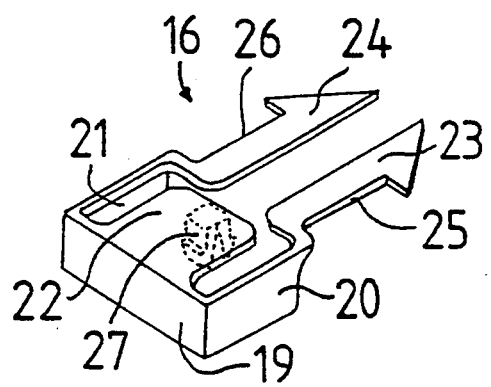
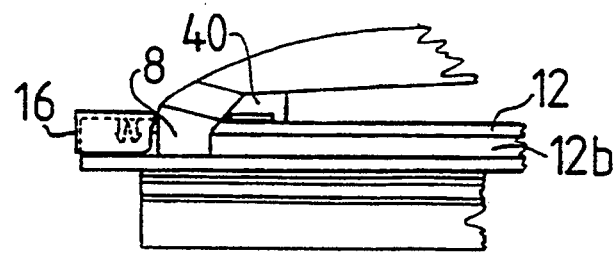
FIG. 4
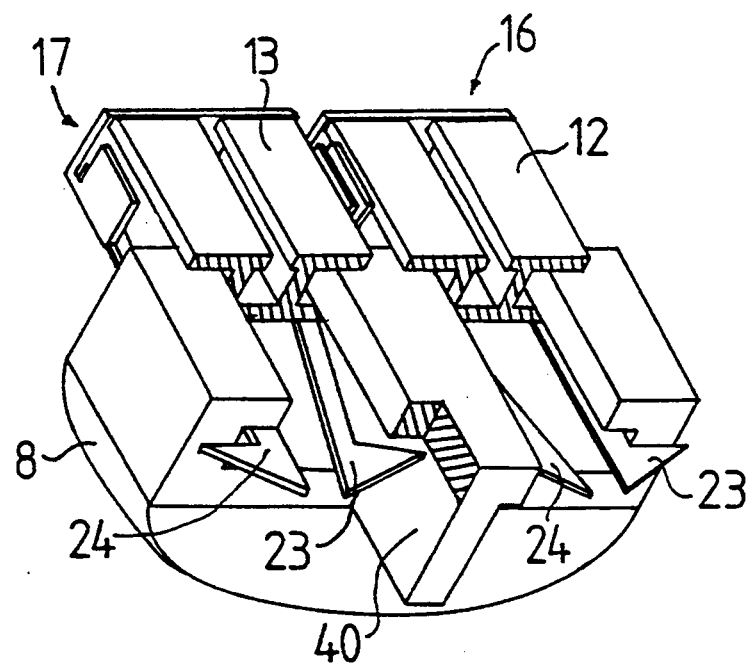
FIG. 3

DUAL WIPER BLADE ASSEMBLY

BACKGROUND OF THE INVENTION

This invention relates to an elongate wiper blade assembly of the kind comprising a yoke structure having a plurality of yokes provided with claw members for supporting backing means carrying two wiper blades. In particular, the invention relates to a wiper blade assembly for motor vehicles.

A known elongate wiper blade assembly of the kind referred to is described in EP-A-0327233 and has a single backing member constituting the said backing means which carries both of the wiper blades. The backing member is specifically designed for carrying two wiper blades and is not interchangeable with backing members intended to be used with wiper blade assemblies having a single wiper blade.

Another known elongate wiper blade assembly of the kind referred to is described in U.S. Pat. No. 4,628,565. In this known wiper blade the backing means consists of two separate backing strips each carrying a different one of the two wiper blades and the claw members are arranged in longitudinally spaced apart pairs for supporting the two backing strips. However the two claw members of each longitudinally spaced apart pair are movable independently of each other so that the two backing strips are supported independently of each other along their lengths.

SUMMARY OF THE INVENTION

The present invention seeks to provide an elongate wiper blade assembly of the kind referred to in which separate backing strips are supported by common claw members along the length of the wiper blade assembly.

According to the present invention an elongate wiper blade assembly of the kind referred to is characterised in that the backing means comprises two separate backing strips each carrying a different one of said two wiper blades and in that each claw member is constructed and arranged to support both of said backing strips.

The two backing strips are thus supported at common positions along their lengths. By employing two separate backing strips, these may be of similar design to backing strips employed in conventional single wiper blade assemblies. This is an important commercial consideration since it is not necessary for manufacturers to manufacture different backing strips for the single and dual wiper blade assemblies or for retailers to stock different replacement backing strips for the two types of wiper blade assembly.

Conveniently each claw member comprises two parallel open channels in which the two backing strips are received. Preferably each open channel has a restricted mouth defined by inwardly extending lip portions designed to be received in opposed open side channels of its associated backing strip.

Preferably the yoke structure and claw members are made of plastics material. Each backing strip is also preferably made of plastics material.

Suitably the wiper blade assembly includes end clip means for engaging a common end of the backing strips and one of the claw members to restrain relative longitudinal movement between the backing strips and the said one claw member. Preferably the end clip means consists of a separate end clip associated with each backing strip. In this case each end clip conveniently comprises means for detachably securing the end clip to one end of its associated backing strip and spaced apart resiliently deflectable legs, at least one of which legs having latching means, e.g. in the form of a recess, for cooperating with said one claw member to restrain said relative longitudinal movement.

BRIEF DESCRIPTION OF THE DRAWINGS

Embodiments of the invention will now be described, by way of example, with reference to the accompanying drawings, in which:

FIG. 2 is a sectional view through part of a wiper blade assembly according to the invention and showing a claw member of the yoke structure shown in FIG. 1 supporting two wiper blades and their associated backing strips, FIG. 3 is a partly cut away perspective view of one end of an elongate wiper blade assembly according to the invention showing the use of end clips to restrain movement of backing strips relative to an endmost claw member, FIG. 4 is a side view of the end of the wiper blade assembly shown in FIG. 3 illustrating the end clips affixed to the claw member, FIG. 5 is a perspective view of one of the end clips shown in FIG. 3 detached from its associated backing strip, FIGS. 6 and 7 are alternative designs of end clip, and FIGS. 8 and 9 are schematic views of different yoke designs which can be incorporated in an elongate wiper blade assembly according to the invention.

DESCRIPTION OF THE PREFERRED EMBODIMENTS

Figure 1:
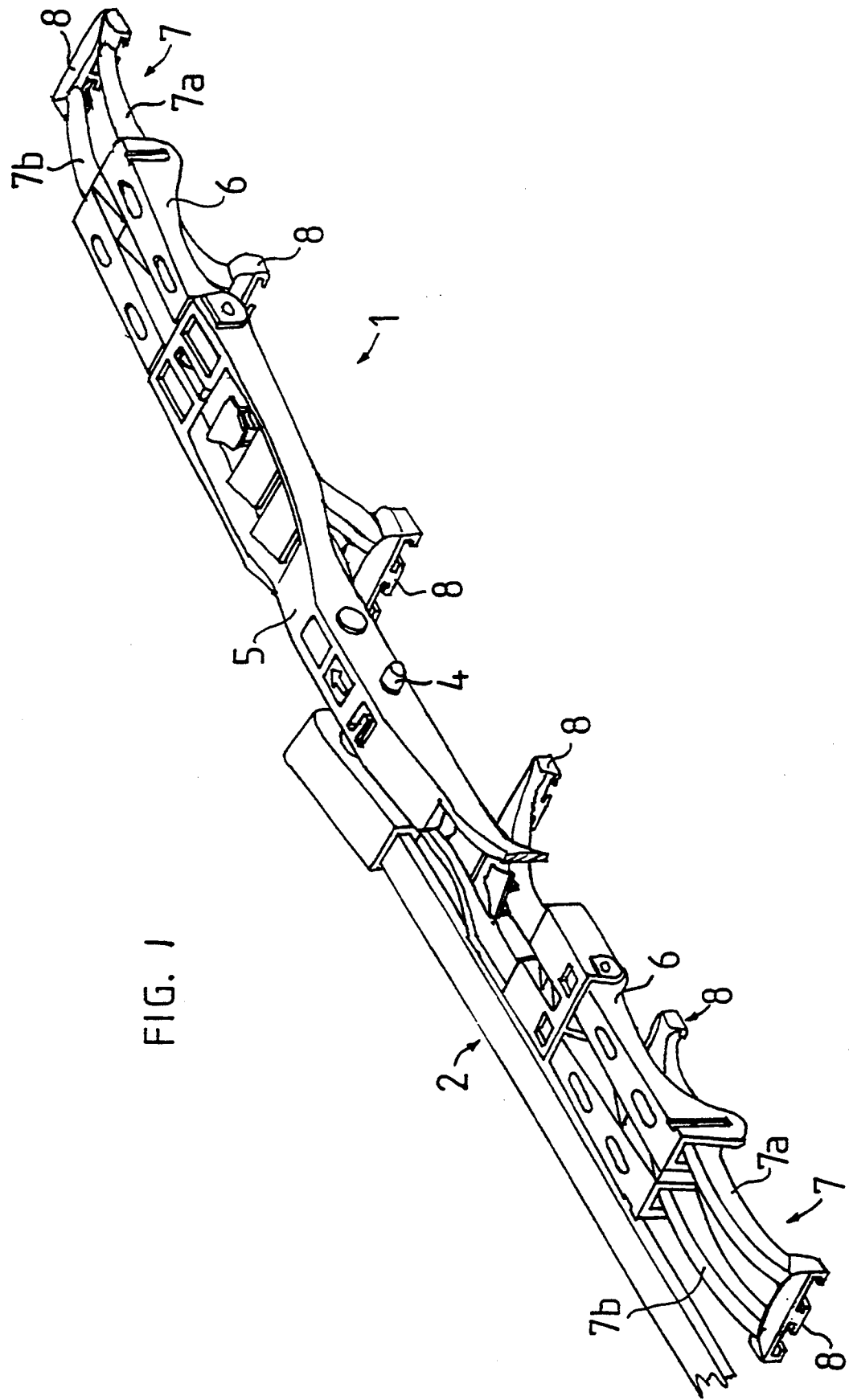
FIG. 1 is a perspective view of a yoke structure for an elongate wiper blade assembly according to the invention.

FIG. 1 shows a yoke structure, generally designated 1, of an elongate wiper blade assembly according to the invention, connected to a wiper arm, generally designated 2, via a pivot pin 4 extending sideways from the wiper arm 2. The yoke structure 1 includes a plastics main yoke 5, plastics secondary yokes 6 articulated to the main yoke 5 and plastics tertiary yokes 7 articulated to the secondary yokes 6. Each secondary yoke 6 has two inner arms joined at their inner ends by a unitary claw member 8. Each tertiary yoke 7 comprises two cradles 7a, 7b each articulated at central regions to an outer end portion of its associated secondary yoke 6 and joined together at their opposite ends by unitary claw members 8. Since the claw members 8 are each of generally the same design they have been identified in the drawings by the same reference numeral.

As can be seen in FIG. 2, each claw member 8 has two spaced apart parallel open channels 10 and 11 having restricted mouths defined by inwardly extending lip portions 10a, 10b and 11a, 11b, respectively. Within each channel 10, 11 there is received an elongate plastics backing strip 12, 13, respectively carrying a wiper element 14, 15, respectively, in the form of a rubber squeegee or the like. Each backing strip 12 (13) has elongate open side channels 12a, 12b (13a, 13b) within which the lip portions 10a, 10b (11a, 11b), respectively, are received to support the backing strips.

Longitudinal movement of the backing strips 12, 13 relative to the outer claw member 8 on one or each of the tertiary yokes 7 is restrained or prevented by end clips 16, 17 ( see FIGS. 3 to 5 ) which are attached to one end of the strips 12, 13, respectively, and which interengage with the claw member (only partly shown in FIG. 3).

The end clips 16, 17 are of similar design and only one end clip 16, shown in FIGS. 4 and 5, will be described in detail. In particular the end clip 16 has a back wall 19 having spaced apart side walls 20 and 21 connected to opposite ends thereof and a tongue 22 connected to the top of the back wall. Spaced apart legs 23 and 24, having rectangular recesses 25 and 26, respectively, formed in their outer edges, are connected to the side walls 20 and 21, respectively. The side walls 20 and 21 and legs 23 and 24 are normally disposed parallel to each other. However, the side walls 20 and 21 are resiliently connected to the back wall 19 and can be resiliently deflected inwardly on application of inward pressure, e.g. finger pressure, to the side walls 20, 21 to cause the legs 23 and 24 to be moved towards each other. The tongue 12 has a bifurcated peg 27 extending downwardly therefrom with diverging bifurcations which are resiliently deflectable towards each other and which are each of rectangular cross-section.

In order to assemble the windscreen wiper blade assembly, the wiper elements 14 and 15 are slotted into bottom slots 30 and 31, respectively, of the backing strip 12 and 13, respectively, and the end clips 16 and 17 are connected to common ends of the backing strips 12 and 13 by pressing the pegs 27 of the end clips into resilient engagement with recesses 26 formed in the backing strips adjacent one of their ends. In this position the legs 23 and 24 of each end clip lie on top of the associated backing strip and the side walls 20 and 21 of each end clip are spaced apart clear of the side edges of the associated backing strip. The backing strips 12, 13 are then threaded on to each of the claw members 8, starting at the end of each backing strip remote from the end to which the end clip is attached, until the position shown in FIGS. 3 and 4 is reached in which the leg 23 of end clip 16 and the leg 24 of end clip 17 are latched to the claw member 8. The other leg of each end clip—i.e. leg 24 of end clip 16 and leg 23 of end clip 17—is kept resiliently urged inwards by an extended central wall 40 of the claw member 8. The provision of the extended central wall 40 enables both end clips 16, 17 to be released together from the claw member 8 by the application of inwards pressure, e.g. finger pressure, to the two outwardly facing side walls of the end clips 16, 17—i.e. side wall 20 of end clip 16 and side wall 21 of end clip 17 are pressed inwardly to release both end clips from the interlocking engagement with the claw member 8.

As an alternative to providing the extended end wall 40, the design of the two end clips 16 and 17 could be replaced by the end clips 50 and 51 shown in FIGS. 6 and 7, respectively. With these clips, a different one of their two legs is not provided with a latching portion—i.e. the leg 50a, 51a of each end clip 50, 51 which is intended to be positioned inwardly of the claw member 8. However these particular designs of end clip are not preferred since two different end clips 50, 51 have to be manufactured for each wiper blade assembly. Although the end clips 16, 17 and 50, 51 are preferably made of plastics material they could, alternatively, be metallic.

The present invention enables two similar backing strips 12, 13, preferably each of the same design as those used in conventional single wiper blade assemblies, to be employed in a dual wiper blade assembly. This is particularly important for manufacturers who only need to manufacture one design of backing strip for both single and dual wiper blade assemblies and for retailers who only need to stock one design of backing strip for the two types of wiper blade assemblies. The unitary claw members ensure that the two backing strips 12, 13 are held fixed relative to each other, i.e. more rigidly, at spaced locations along their lengths. The use of twin wiper blades provides an improved windscreen wiping effect over a single wiper blade. In particular, the first wiper blade is intended to clear most of the water from the windscreen and the second wiper blade is intended to clear any streaks left by the first wiper blade. Although the invention has been described with particular reference to wiper blade assemblies made of plastics material, it should be realised that the yoke structure, including the claw members, could be metallic, or at least partially metallic. Similarly the backing strips could also be metallic.

FIGS. 8 and 9 schematically illustrate alternative yoke designs which can be incorporated in elongate wiper blade assemblies according to the invention.

It is to be understood that the invention is not considered to be limited to the precise details and constructions set forth in this specification and modifications may be made with in the scope of the appended claims.

I claim:

1. An elongate wiper blade assembly comprising backing means carrying two wiper blades, and a yoke structure having a plurality of yokes provided with claw members for supporting said backing means, wherein the backing means comprises two separate backing strips each carrying a different one of said two wiper blades, and wherein each claw member comprises a unitary member having a pair of claws, each claw of the pair having a pair of lip portions extending therefrom towards one another, each claw of the pair supporting a different one of said two back strips.

2. A wiper blade assembly according to claim 1, in which the two backing strips are substantially identical.

3. A wiper blade assembly according to claim 1, in which each of said unitary members has two parallel open-ended channels in each of which one of the two backing strips is received.

4. A wiper blade assembly according to claim 3, in which each said backing strips has opposed open side channels, and in which each open-ended channel has a restricted mouth defined by said lip portions which are received in the opposed open side channels of its associated backing strip.

5. A wiper blade assembly according to claim 1, in which the yoke structure and claw members are made of plastics material.

6. A wiper blade assembly according to claim 1, in which each backing strip is made of plastics material.

7. A wiper blade assembly according to claim 1, in which said two backing strips are situated in substantially parallel relation to each other, each of said backing strip has opposite first and second ends, and the first ends of said two backing strips are situated in close proximity to each other, said assembly including end clip means for engaging said first ends of both backing strips and an endmost one of the claw members to restrain relative longitudinal movement between the backing strips and the said endmost claw member.

8. A wiper blade assembly according to claim 7, in which the end clip means consists of a separate end clip engaged with each backing strip.

9. A wiper blade assembly according to claim 8, in which each end clip comprises means for detachably securing the end clip to one end of the engaged backing strip and spaced apart resiliently deflectable legs, at least one of said legs having latching means for engaging with said endmost claw member to restrain said relative longitudinal movement.

10. A wiper blade assembly according to claim 9, in which each leg of each end clip is provided with said latching means and the endmost claw member is engaged by only the outer leg of each end clip for retention therewith, the outer leg of each end clip being resiliently deflectable inwardly out of latching engagement with said endmost claw member to enable release of each backing strip.

11. A wiper blade assembly according to claim 10, in which the endmost claw member has central wall means to prevent latching cooperation of the latching means of the inner leg of each end clip claw.

12. An elongate wiper blade assembly according to claim 1 in which each said unitary member is connected to a pair of said yokes, and in which the pair of yokes to which each said unitary member is connected extend substantially in parallel relationship to each other.

13. An elongate wiper blade assembly comprising two elongate backing strips, each having opposite first and second ends, and a yoke structure having a plurality of yokes provided with a plurality of claw members, including an endmost claw member, each claw member being in the form of a unitary element having a pair of claws, for supporting said two elongate backing strips, each claw of the pair having a pair of lip portions extending therefrom towards one another, each backing strip carrying a different wiper blade, and a separate end clip coupled with each backing strip, each end clip engaging the first end of its respective backing strip and said endmost claw member to restrain longitudinal movement of the respective backing strip relative to the endmost claw member, each end clip having means for detachably securing the end clip to the first end of its respective backing strip and means for detachably securing the end clip to the endmost claw member, said means for detachably securing the end clip to the endmost claw member including, transversely spaced apart resiliently deflectable inner and outer legs, the outer leg of each end clip having latching means for latching engagement with said endmost claw member to restrain said relative longitudinal movement, and the inner leg of each end clip contacting and said endmost claw member in an unrestraining manner allowing relative sliding movement without latching engagement with each other throughout their range of contact.

14. An elongate wiper blade assembly according to claim 13 in which the inner leg of each end clip has a latching surface formed thereon, and in which said endmost claw member includes a pair of slots for receiving said backing strips and said end clips, and a central wall separating said slots, said central wall having smooth surfaces for engagement by the inner legs of the end clips, said smooth surfaces being sufficiently long in the direction of insertion of said clips to prevent latching engagement of said latching surfaces formed on the inner legs of the end clips with said endmost claw member.

* * * * *

UNITED STATES PATENT AND TRADEMARK OFFICE
CERTIFICATE OF CORRECTION

PATENT NO. :   5,339,490

DATED :   August 23, 1994

INVENTOR(S) :   Cedric S. K. Charng

It is certified that error appears in the above-identified patent and that said Letters Patent is hereby corrected as shown below:

Column 5, line 19, after "clip" insert --with the endmost--.

Signed and Sealed this

Twenty-fifth Day of October, 1994

*Attest:*

BRUCE LEHMAN

*Attesting Officer*   *Commissioner of Patents and Trademarks*